United States Patent [19]
Ward

[11] 4,046,203
[45] Sept. 6, 1977

[54] FOLDING TOOL BAR FOR AGRICULTURAL IMPLEMENTS

[75] Inventor: Gerald G. Ward, Naperville, Ill.

[73] Assignee: International Harvester Company, Chicago, Ill.

[21] Appl. No.: 649,931

[22] Filed: Jan. 19, 1976

[51] Int. Cl.² .............................................. A01B 15/14
[52] U.S. Cl. ..................................... 172/456; 172/657
[58] Field of Search .......................... 16/137, 135, 147;
172/311, 456, 491, 128, 130, 657; 280/411 A, 411 C, 411 R, 412; 92/140; 74/99 R

[56] References Cited

U.S. PATENT DOCUMENTS

| | | | |
|---|---|---|---|
| 1,805,588 | 5/1931 | Manley | 92/140 X |
| 3,741,312 | 6/1973 | Hayter | 172/657 |
| 3,774,693 | 11/1973 | Orthman | 172/311 |
| 3,941,194 | 3/1976 | Orthman | 172/456 X |

*Primary Examiner*—Richard J. Johnson
*Attorney, Agent, or Firm*—F. David AuBuchon

[57] ABSTRACT

A folding sectional tool bar for agricultural implements and including a hollow horizontal main section and wing sections hingedly connected thereto for independent movement between lowered operative positions and raised inoperative over-center parked positions. An articulated actuating linkage mechanism for each wing section embodies a hydraulic cylinder wholly positioned within the main section and having a plunger operatively connected to a crank arm on the adjacent wing section by means of a draw link which functions initially as the plunger is extended to engage the crank arm and transmit torque to the latter so as to raise the wing section by a powerful leverage action, and which subsequently functions, as the plunger continues to be extended, to move away from the crank arm and act in tension and transmit the necessary torque to raise the wing section and force it over to its parked position. The torque-applying draw link carries latch finger which can cooperate with a latch block on the main tool bar section to lock the wing section in its operative horizontal position. A floating link extends between the crank arm and plunger and supports the cylinder in an elevated position when the wing section is fully raised in order that upon retraction of the plunger for wing lowering purposes the draw link will not assume an improper over-center position when the plunger commences its retraction. Two slightly different forms of articulated linkage mechanisms which operate upon the same principle are disclosed, and a modified form of tool bar having a flexible central main section consistent with such two forms of linkage mechanisms is also disclosed.

29 Claims, 18 Drawing Figures

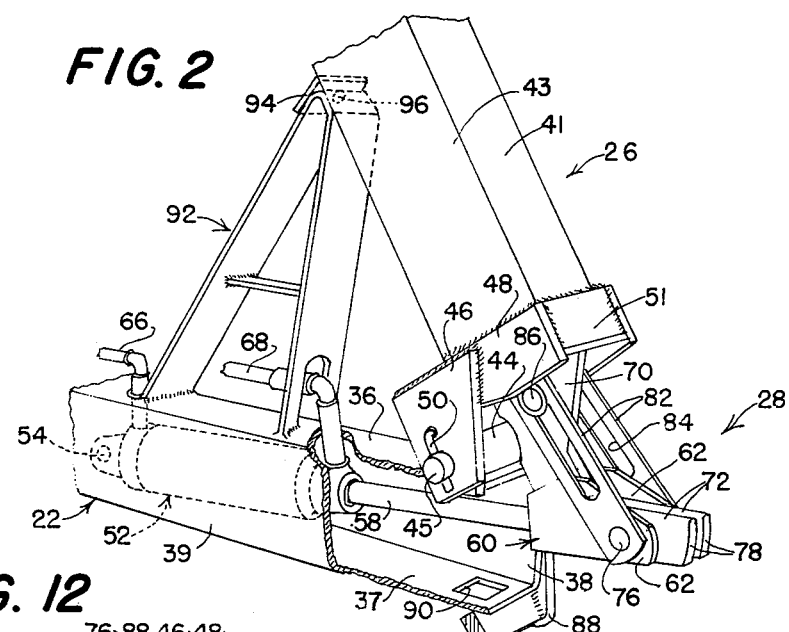
FIG. 2
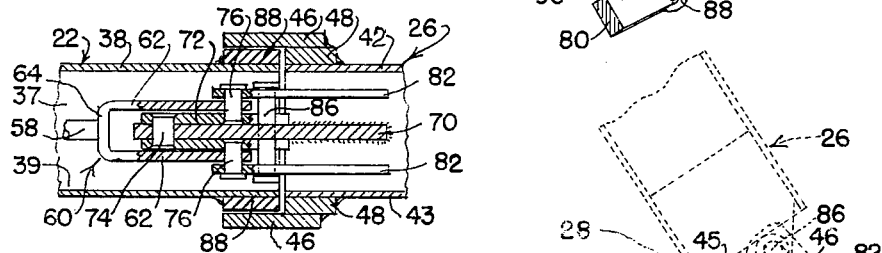
FIG. 12
FIG. 3
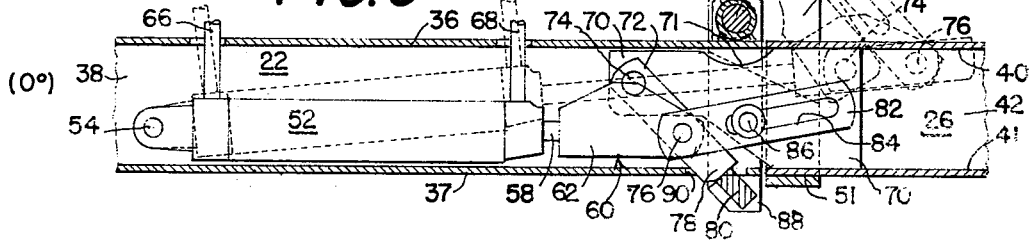
FIG. 4
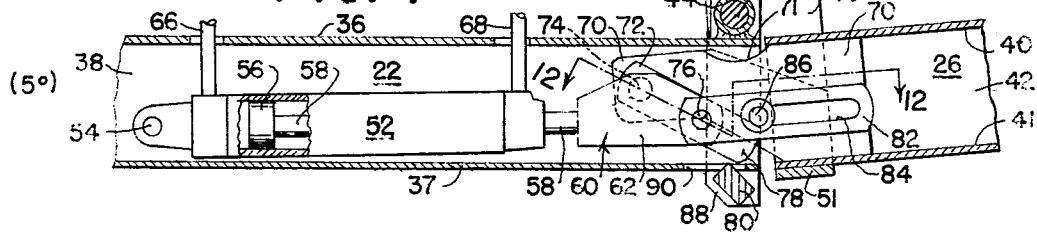
FIG. 5
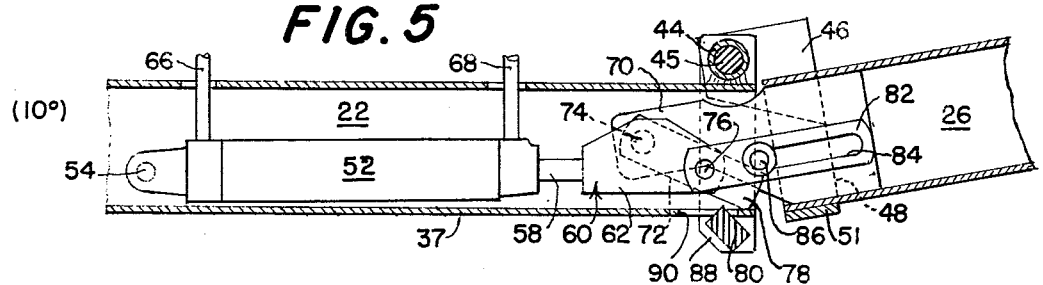

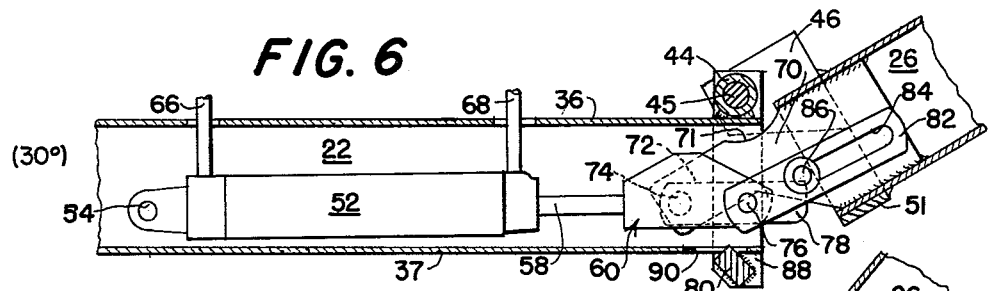
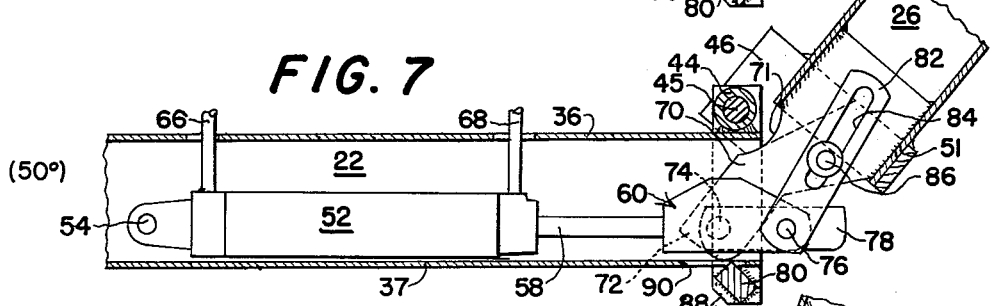
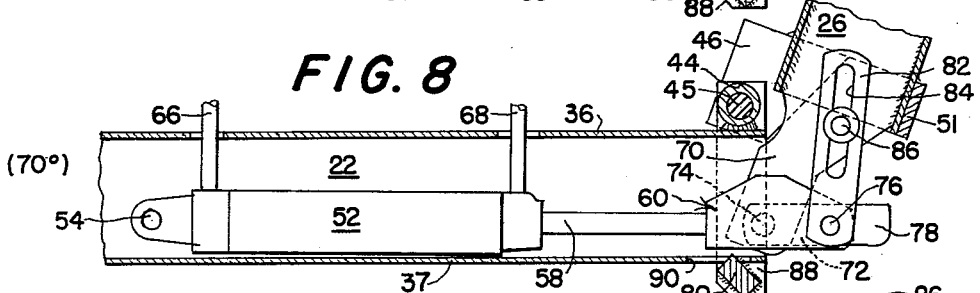
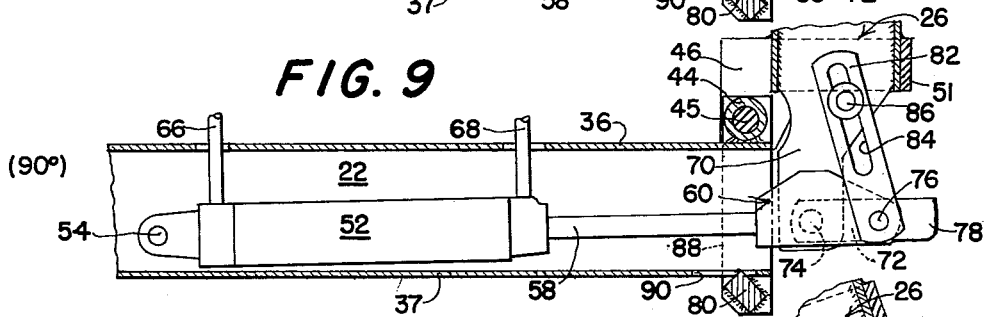
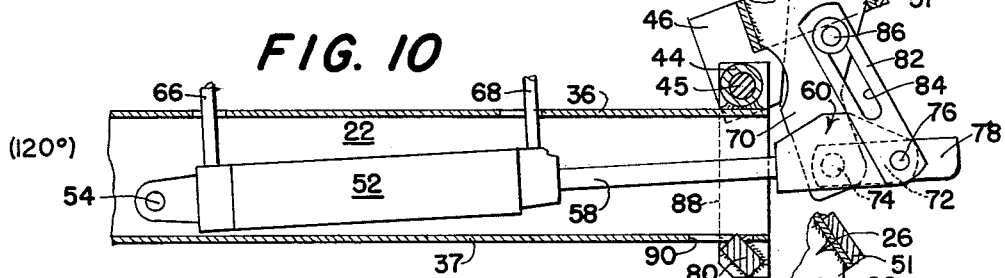
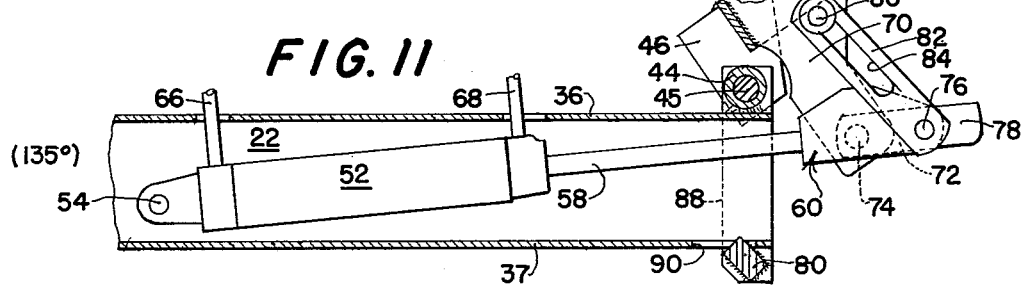

(-5°)

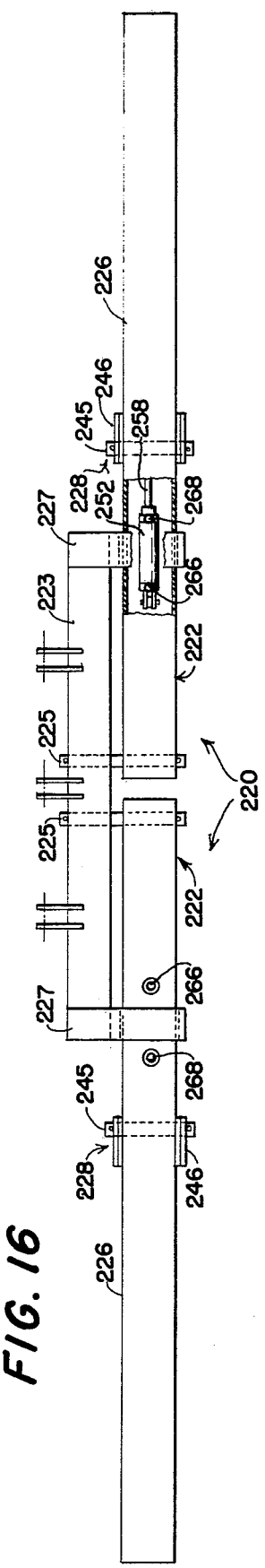
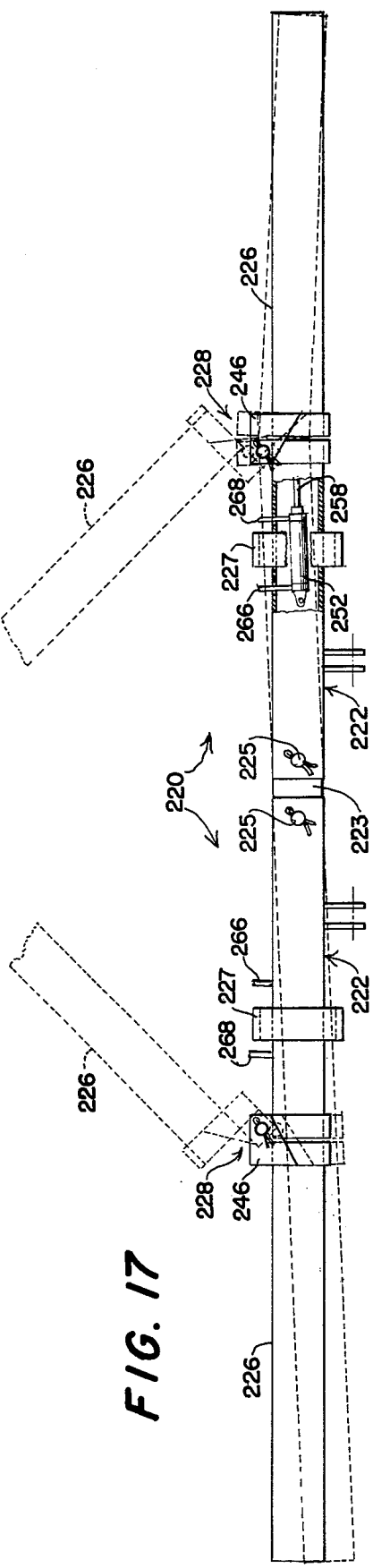
FIG. 16
FIG. 17

FOLDING TOOL BAR FOR AGRICULTURAL IMPLEMENTS

The present invention relates generally to agricultural implements of the type having folding tool bars wherein a horizontal main section has pivoted thereto at either or both of its ends an extension or wing section which is movable between an operative lowered earth-working position and an inoperative raised transport position. The invention is particularly concerned with a novel hydraulic power actuating mechanism by means of which such a wing section may be swung between its raised and its lowered position.

Hydraulically operable folding tool bars of this general type invariably employ a hydraulic cylinder and plunger arrangement which is effective between the main tool bar section and a short crank arm on the wing section either by retraction of the plunger or by extension thereof. Where retraction of the plunger is utilized, it is necessary that both the cylinder and the crank arm be mounted exteriorly of the tool bar sections to which they are applied so that they occupy space which otherwise could be used for the attachment of earth-working tools to the tool bar sections. Where extension of the plunger is utilized, in many instances the same limitation is prevalent, both the cylinder and crank arm being mounted exteriorly of the tool bar sections.

It has recently been found that in connection with this latter class of articulated tool bar, that if the main tool bar section is of hollow construction, the cylinder may be totally enclosed within such section and the outer end of the plunger may be pivoted directly to a crank arm on the adjacent wing section which extends into the open end of the main section when the two sections are in alignment. By such an arrangement, both the cylinder and crank arm are totally enclosed and concealed within the tool bar so that there is no interference with any desired selected application of earth-working tools to either tool bar section. Reference is hereby made to U.S. Pat. No. 3,774,693 which discloses such an arrangement. It is to this latter type of articulated tool bar construction that the present invention specifically relates.

In connection with such hollow cylinder-containing tool bar arrangements, as well as with all cylinder-actuated folding tool bars, it is invariably the practice to pivotally connect the outer end of the plunger directly to the short crank arm at the end of the wing section and, therefore, because of the shortness of the crank arm, extremely large forces are required to move the wing section, especially at the outset when the wing section is initially being lifted from its horizontal ground-engaging position. The need for maximum torque to the crank arm at this time is compounded by the fact that the ground-engaging tools which depend from the wing section swing outwardly as the wing section rises and thus increases the gravitational load on the wing section, at least during the first approximately 30° rise of the wing section. Another consideration requiring maximum torque at this time resides in the frictional resistance offered to the tools by the ground as they swing out laterally while still in contact with the ground.

It has been found that with present day hollow cylinder-enclosing tool bar devices numerous limitations are present, principal among which is the inability of the directly pivoted plunger to exert a maximum moment of force on the crank arm at the outset when it is needed to initially raise the wing section from its earth-working position and to subsequently maintain adequate force on the crank arm throughout the remainder of the plunger stroke. This is due to the limited space which is afforded for swinging movement of the enclosed cylinder as well as to the length of the crank arm on the wing section. Interference with the movements of both the cylinder and its plunger as well as the crank arm by the wall of the hollow main tool bar section is such that it is necessary to establish a pivotal connection between the plunger and crank arm at a point where initial projection of the plunger produces a small moment of force on the crank arm. Then, as the plunger moves outwardly, the moment of force gradually increases so that by the time the maximum moment of force does act on the crank arm, the wing section has risen appreciably from its earth-working position and gravitational forces on such section have decreased so that such maximum moment of force is not needed.

The present invention is designed to overcome the above-noted limitation that is attendant upon the construction and use of hollow, cylinder-enclosing tool bar constructions and, toward this end, the invention contemplates the provision of a novel torque-transmitting mechanism which is effective between the plunger of the tool bar-enclosed cylinder and the crank arm on the wing section in such a manner that it will present a maximum moment of force at the outset and precisely at the time the wing-supported tools are lifted from the ground, and which, moreover, will maintain substantially such maximum moment of force for at least the duration of time that is required for the ground-engaging tools to swing out and then swing inwardly again until their gravitational effect is counteracted by the normal decrease in the cosine function of the angle involved as the wing section rises. The provision of such a torque-transmitting mechanism constitutes the principal object of the present invention.

In carrying out this object, instead of pivoting the outer end of the plunger directly to the crank arm, a combined lever and draw link is effectively pivoted to the plunger and crank arm and functions initially as the plunger is extended to engage an abutment on the crank arm and apply torque to the latter by a lever action with a large moment of force so as to raise the wing section from its operative extended position. Continued extension of the plunger causes the draw link to move away from the abutment on the crank arm, at which time the draw link functions under tension and continues to apply torque to the crank arm with a substantially undiminished moment of force until such time as the critical angle of the tool-loaded wing section is no longer such as to require an appreciable degree of force on the crank arm.

An additional feature of novelty associated with the present invention resides in the provision of a novel latch means which can if so desired become automatically effective each time that the wing section is moved to its fully extended lowered earth-working position to lock the wing section in such position against upward floating movement incident to undulatory ground terrain. According to the invention, such latch means is effective under the control of the hydraulic cylinder within the hollow main tool bar section, its latching function taking place automatically when the plunger of the cylinder becomes fully retracted and its unlatching function taking place substantially at the precise moment that the plunger commences its outward stroke. This latch means is conveniently made a part of the aforementioned torque-transmitting mechanism and is in the form of a latch finger or projection on the combined lever and draw bar which is associated with such mechanism, the latch finger moving into latching engagement with a fixed latch member carried by the main tool bar at such time as the plunger becomes retracted, and moving out of latching engagement with the member immediately as the plunger commences its outward stroke. By such an arrangement, extraneous latch devices which require the operator to dismount from the tractor are eliminated.

Another novel feature embodied in the present invention is made possible by reason of the aforementioned torque-transmitting mechanism which is effective between the plunger and the crank arm on the wing section. As previously set forth, with conventional pivoted, tool bar-enclosed cylinders in which the plunger is pivoted directly to the crank arm of the wing section, the limited space which is available for swinging movement of the cylinder within the tool bar and the length of the plunger are such that, at best, the full stroke of the plunger allows the wing section to be moved only throughout an angle of approximately 90°, thus bringing the wing section from a horizontal position to a vertical parked position. Where depending earth-working tools of any appreciable length and mass are mounted on the wing section, the vertical position of the tool bar is not a stable position of equilibrium. According to the present invention, the wing section of the folding tool bar is capable of moving to an over-center parked position where its center of mass lies inwardly of a vertical plane passing through the hinge joint so that the tendency for the wing section as a whole is to lean inwardly and overlie the main tool bar section where it may be secured to a suitable limit stop or abutment. This of course requires a crank arm sweep somewhat in excess of 90° and which is made possible by reason of the aforementioned draw link which connects the outer end of the plunger to the crank arm and permits the necessary pivotal movement of the tool bar-enclosed cylinder without interference by either the top or bottom walls of the main tool bar. With the wing section thus leaning inwardly, greater safety is assured by reason of the reduced width of the implement at the higher levels thereof.

A further novel feature of the invention which also is incident to the design of the torque-transmitting mechanism resides in the provision of a means for maintaining the cylinder and its associated plunger in a raised position at such time as the wing section attains and subsequently exceeds its raised position of stable equilibrium, thus insuring that the draw link will not pass over a dead center when the plunger is retracted so that it will be restored to its normal position within the hollow main tool bar section for proper cooperation with the aforementioned latch member when the wing section returns to its lowered position, all in a manner that will be made clear subsequently when the operation of the torque transmitting mechanism is set forth.

Numerous other objects and advantages of the invention, not at this time enumerated, will become readily apparent as the nature of the invention is better understood.

DESCRIPTION OF THE DRAWINGS

In the accompanying three sheets of drawings forming a part of this specification, one illustrative embodiment of the invention has been shown.

FIG. 2 is an enlarged fragmentary detail perspective view of a limited region of the folding tool bar, the view being taken in the vicinity of one of the hinge joints, a portion of the central or main tool bar section being broken away in the interests of clarity, and the adjacent tool bar extension or wing section being shown in its fully folded, raised inoperative position;

FIG. 3 is a fragmentary longitudinal sectional view of the folding tool bar in the vicinity of one of the hinge joints, showing the hinge-actuating cylinder and its associated articulated linkage mechanism in elevation, and with the tool bar wing section in its fully extended and latched position;

FIG. 4 is a sectional view, similar to FIG. 3, showing the tool bar wing section unlatched and at the commencement of its rising operation wherein a 5° angular elevation has been attained;

FIG. 5 is a sectional view, similar to FIGS. 3 and 4, showing the tool bar wing section disposed at a 10° angular elevation;

FIGS. 6 to 10, inclusive, are sectional views, similar to FIGS. 3 and 4, showing the tool bar wing section progressively raised through 30° increments from the position in which it is shown in FIG. 5;

FIG. 11 is a sectional view similar to FIG. 10, showing the tool bar wing section raised an additional 15°;

FIG. 12 is a sectional view taken substantially on the line 12—12 of FIG. 4;

FIG. 16 is a fragmentary plan view of a modified form of multi-section folding tool bar which is capable of embodying the folding wing structure of either FIGS. 1 to 13, and in which the main tool bar section is comprised of two articulated sub-sections, thereby contributing further flexibility to the tool bar as a whole; and FIG. 17 is a rear elevational view of the structure shown in FIG. 16.

DESCRIPTION OF THE PREFERRED EMBODIMENT

Figure 1:
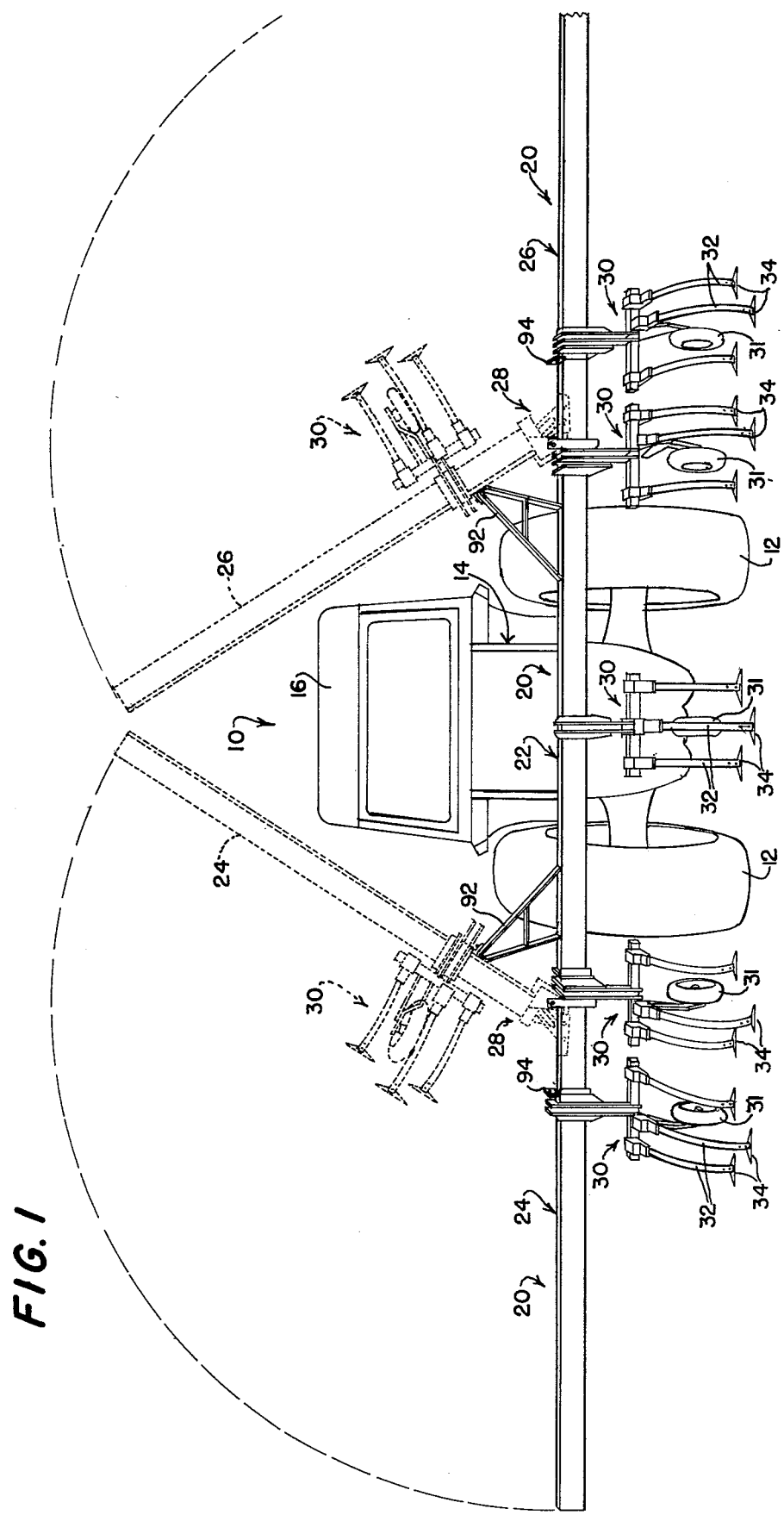
FIG. 1 is a rear elevational view of a farm implement embodying the improved folding tool bar of the present invention and showing the same in its extended or working position.

Referring now to the drawings in detail, and in particular to FIG. 1, a mobile agricultural implement embodying the novel folding tool bar of the present invention is designated in its entirety at 10, such implement being of conventional construction and embodying the usual traction driving wheels 12, chassis or frame 14, operator's cab 16, and other implement adjuncts which bear no direct relation to the present invention and which, therefore have not been disclosed herein.

Operatively mounted at the rear of the implement 10 and suitably supported from the implement frame 14 is a transversely extending, folding tool bar assembly 20 which is constructed according to the present invention and which consists of a fixed main or central inner tool bar section 22 and a pair of outer end sections 24 and 26 which are commonly referred to in the industry as wing sections. The wing sections 24 and 26 are hingedly connected to the opposite ends of the fixed main section 22 in a manner that will be set forth in detail presently by means of offset hinge joints 28 for swinging movement between the lowered horizontal inline position in which they are shown in FIGS. 1 and 3 and the raised overcenter dotted line position in which they are shown in these views and in the full line position shown in FIG. 2. A plurality of ground-engaging tool assemblies 30 having gauge wheels 31 are carried on the main tool bar section 22 and wing sections 24 and 26 in spaced relationship along the length of the tool bar. Preferably these ground engaging tool assemblies are uniformly spaced along the tool bar but in the interests of clarity of disclosure herein several such assemblies have been omitted, only three assemblies being disposed on the main tool bar section 22 and a single assembly being disposed on each tool bar wing section 24 and 26.

The particular agricultural implement selected herein as an environment for the present invention is in the form of a farm cultivator in which the various tool assemblies 30 are in the form of cultivator units embodying chisel teeth 32 having sweeps 34 thereon. It is to be distinctly understood, however, that if desired, a wide variety of other forms of tool assemblies may be associated with the tool bar assembly 20 for example cultivator disks, shovels, planter units, subsoil plows, middle-busters and other tools too numerous to mention. Irrespective, however, of the particular tool assemblies which may be associated with the tool bar, the essential features of the invention remain substantially the same.

Referring now, additionally, to FIGS. 2, 3 and 12, the fixed main tool bar section 22 is of hollow tubular construction and is preferably, but not necessarily, rectangular in transverse cross section, thus providing top and bottom walls 36 and 37, and front and rear side walls 38 and 39. The two wing sections 24 and 26 are substantially identical and therefore a description of one of them will suffice for them both. These wing sections are likewise of hollow rectangular tubular construction and have transverse dimensions conforming to those of the main tool bar section, thus presenting top and bottom walls 40 and 41 and front and rear side walls 42 and 43. In the interests of brevity, the main tool bar section 22 will hereinafter be referred to as the fixed tool bar, or simply as the tool bar while the tool bar end sections or extensions will be referred to as the wings.

Still referring to FIGS. 2, 3 and 12, the offset hinge joint between the tool bar 22 and wing 26 is established by the provision of a hinge sleeve 44 which is fixedly secured as by welding to the top wall 36 of the fixed tool bar. A hinge pin or shaft 45 projects through the hinge sleeve 42 so as to provide trunnion-like ends which receive thereover a pair of side plates 46 which are welded to reinforcing plates 48 that, in turn, are welded to the side walls 42 and 43 of the wing 26 at the extreme proximate or inner end of the latter. Lock pins 50 hold the hinge pin 44 in position while a reinforcing plate 51 extends across the bottom wall 41 between the reinforcing plates 48. The side plates 46 are so dimensioned that they provide the necessary offset for the hinge joint 28 so that when the wing and fixed tool bar are in their extended or aligned position, the adjacent open ends thereof mate with each other as clearly shown in FIG. 3.

Hydraulic power means are provided for raising and lowering the wings 24 and 26 between their operative ground-engaging positions and their "parked" inoperative over-center positions, such means being identical and independently operable. In the case of the tool bar wing 26 this power means involves in its general organization a hydraulic cylinder 52 which is wholly disposed and therefore concealed within the fixed tool bar 22 and which has its inner end pivoted on a pin 54 which extends between the side walls 38 and 39. The cylinder 52 is provided with a piston 56 (FIG. 4) and a plunger 58 which projects outwardly from the cylinder and carries at its distal end a yoke 60 having parallel side arms 62 and a connecting base or bight portion 64. Hydraulic fluid lines 66 and 68 lead to the opposite end regions of the cylinder 52. Reference to FIGS. 3 and 12 will reveal the fact that when the plunger 58 is fully retracted, the yoke 60 is completely withdrawn into the open end of the fixed tool bar 22 and when the plunger is fully extended as shown in FIGS. 2 and 11, the yoke 60 is projected outwardly beyond the confines of the tool bar 22 in a manner and for a purpose that will be made clear presently.

The use of an offset type hinge construction between the fixed main section of a foldable tool bar and the use of a pivoted cylinder which is concealed within such main section for exerting a direct thrust upon a wing section in order to swing the latter between operative and inoperative positions is not novel. However, in connection with constructions of this sort, it has usually been the practice to pivotally connect the yoke at the outer end of the plunger directly to a short crank arm on the wing section. When such a direct connection is effected, all of the previously outlined limitations which result in the failure to apply maximum lifting force to the wing section at the time it is needed, the application of such maximum force to the wing section at a time when it is not needed, and the inability of the hydraulic cylinder to swing the wing section to an over-center position where the gravitational force acting thereon maintains the same securely in its "parked" position, become prevalent.

According to the present invention, a novel articulated linkage system is effective between the yoke 60 at the outer end of the plunger 58 and the proximate or inner end of the adjacent wing section 26, the connection including a flat plate-like crank arm 70 (FIGS. 2, 3 and 12) which projects into the adjacent open end of the hollow fixed tool bar 22 when the wing 26 is in its horizontal ground-engaging position and which is withdrawn when the wing section is in its raised position. A clearance notch 71 in the upper edge of the crank arm allows the latter to clear the top wall 36 during swinging movement of the wing 26.

The linkage system further embodies a combined lever and draw link 72 which is of the dual-link type and consists of a pair of parallel link sections on opposite sides of the crank arm 70 and which are pivoted at their inner or rear ends to the distal end of the crank arm by a rivet-like pivot pin 74. The forward end region of the dual draw link 72 is pivoted to the yoke arms 62 by rivet-like pins 76. As will become apparent presently, the effective length of the dual draw link 72 is that portion thereof which extends between the axes of the pivot pins 74 and 76 but a forward extension 78 of the draw link 72 extends a short distance beyond the pivot pins 76 as clearly shown in FIGS. 2 and 3, and establishes a latch lug which is designed for cooperation with a latch block 80 when the wing 26 is in its horizontal earth-working position of alignment with the tool bar 22, all in a manner and for a purpose that will be made clear presently.

The aforementioned pivot pins 76 which connect the dual draw link 72 to the yoke arms 62 also serve to pivotally connect the inner or proximate ends of a dual floating slotted suspension link 82 to the outer ends of the yoke arms 62. Such suspension link 82 is comprised of two link sections having elongated slots 84 therein which receive therethrough the opposite end regions of a multi-purpose dual-headed pin 86 which functions primarily as a lift abutment which receives the upward thrust from the latch lug portion 78 of the draw link 72 during the initial lifting phase of the wing 26, and functions secondarily during the terminal shifting phase of the wing 26 to suspend the yoke 60, and consequently the entire cylinder and plunger assembly in an elevated position in a manner and for a purpose that will be described in detail presently. A third function of the pin 86 is to guide the slotted dual suspension link 82 into the adjacent end of the hollow tool bar section 22 during the lowering phase of the wing section 26.

The aforementioned latch block 80 which cooperates with the latch lug 78 is carried at the lower ends of a pair of suspension straps 88 which are welded to the sidewalls 38 and 39 of the tool bar 22 and which depend therebeneath for reception thereacross of such latch lug 78. A rectangular opening 90 is formed in the bottom wall 37 of the tool bar 22 in the vicinity of the latch block 80 to enable the latch lug 78 to pass through such wall and engage the latch block 80 at such time as the wing 26 is in its extended horizontal ground-working position.

As shown in FIGS. 1 and 2, a pair of inverted V-shaped pillars 92 of appreciable height are welded to the top walls of the center section 22 near the outer ends thereof and establish lean-to limit stops or abutments for determining the over-center parked positions of the tool bar wing sections 24 and 26, the over-center angle of these wing sections being on the order of 45° at such time as they are in engagement with such abutments so that the completely folded tool bar assembly 20 assumes generally the outline of an isosceles triangle. A locking plate 94 carried by the top wall 40 of the wing section 26 overlaps the upper end of the adjacent abutment and is adapted to be secured to the abutment of a fastening pin 96.

OPERATION OF THE FOLDING TOOL BAR

It will be understood that operation of the herein described folding tool bar 20 may be effected selectively by the operator of the implement 10 under the control of one or more directional control valves (not shown) which are operatively connected to the fluid lines 66 and 67 leading to the cylinders 52 which are disposed within the fixed central tool bar section 22, as well as to a suitable source of hydraulic fluid under pressure.

Assuming for purpose of discussion that the tool bar assembly 20 is in its normal horizontal extended earth-working position as shown in FIGS. 1 and 3, and that it is desired to raise the wing section 26, the appropriate directional valve will be actuated so as to supply fluid to the cylinder 52 through the fluid line 66, thus shifting the piston 56 (which appears in FIG. 4 only) to the right as viewed in FIG. 3, thereby causing the plunger 58 to commence its outward movement. At this time the dual combined lever and draw link 72 will assume the inclined position in which it is shown in this view wherein it is disposed in reentrant fashion relative to the yoke 60 with the curved lower end of the projecting latch lug 78 bearing against the latch block 80, thereby maintaining or locking the wing section 26 in alignment with the main tool bar section 24 as previously described as shown in FIG. 3. An initial slight outward projection of the plunger 58 and its associated yoke 60 will cause the draw link 72 to swing in a counterclockwise direction about the axis of the pivot pin 74 on the crank arm 70, thus sliding the lower end of the latch lug 78 in a direction which will hereinafter be referred to as "forwardly" so that it leaves its contact with the latch block 80 and thus unlocks the wing section 26, so to speak, and shifts the draw link 72 to the position in which it is shown in FIG. 4. For convenience of description, this extended position of the wing section 26 has been designated in the left hand margin of FIG. 3 as the 0° position and it will be noted at this time that there is a small clearance at the proximate end of the slot 84 of the dual suspension link 82 for forward shifting of the link relative to the combined guide and abutment pin 86 on the crank arm 70. It is to be noted also that upon initial application of fluid to the cylinder 52, such fluid is applied to the large-area side of the piston 56 for piston-motivation, thus allowing a relatively short cylinder to be employed as distinguished from cylinder and piston devices where the initial power stroke is obtained by supplying fluid to the small-area side of the piston.

At such time as the plunger 58 and yoke 60 attain the positions in which they are shown in FIG. 4 wherein the wing section 26 has been raised through an angle of approximately 5° as designated in the margin of this view, the upper inclined edge of the draw link 72 will have engaged the abutment pin 86 and, by a lever action due to further swinging of the draw link, swung the crank arm 70 in a counterclockwise direction, thus raising the wing section 26 to the 5° position in which it is shown in this view. At this time the yoke 60 will have forced the suspension link 82 forwardly so that the left hand or proximate end of the slot 84 in such link engages the abutment pin 86, thereby placing a limited region of the link 82 under compression and assisting the draw link 72 in its application of torque to the crank arm 70 so that the latter is acted upon by two different vectorial forces.

During continued forward movement of the plunger 58 and yoke 60, both the draw link 72 and slotted link 82 remain effective to apply their respective moments of force to the crank arm 70 through the medium of the abutment pin 86 so that the wing section 26 is raised to approximately its 10° position as shown in FIG. 5, the same phenomena remaining effective during forward travel of the plunger 58 and yoke 60 until the crank arm 70 has been swung to such a position that the wing section 26 assumes its approximately 30° position as shown in FIG. 6. It is to be noted, however, that in its 30° position the draw link has assumed a substantially horizontal position, that the clearance notch 71 has allowed the crank arm 70 to assume its 30° without interfering with the top wall 36 of the main wing section 22, and that the vectorial application of torque to the abutment pin 86 (and consequently the crank arm 70) has changed appreciably as regards its direction but, as will be made clear presently, but not as regards its magnitude.

As the plunger and yoke continue their forward movement to bring the wing section 26 away from its 30° position and toward the 50° position wherein it is shown in FIG. 7, the abutment pin 86 moves away from the draw link 72 which now assumes a horizontal position and the yoke 60, acting on the dual pins 76 places the draw link 72 under tension so that the latter, under the influence of the pin 74, continues to apply torque to the crank arm 70, the draw link now constituting the sole motivating force for the crank arm, inasmuch as the abutment pin 86 also has moved away from the proximate end of the slot 84.

The application of torque to the crank arm 70 by the draw link 72 continues to prevail during movement of the wing section from the 50° position of FIG. 7 to the 70° position in which it is shown in FIG. 8, the draw link remaining in its horizontal position but the slotted link 82 shifting toward a vertical position as shown in this view. From the time that the pin 86 moves away from the inner or lower end of the slot 84 in the link 82, shortly after the 30° position of FIG. 6, until it engages the opposite end of such slot as shown in FIG. 10, this link 82 functions as a floating link the direction of which is guided by the relationship between the positions of the two pins 76 and 86.

In FIG. 9 which represents the 90° position of the wing section 26, the plunger 58 and yoke 60 have moved forwardly to such an extent that the yoke is completely projected from the interior of the main tool bar section 22, and the slotted link 82 has moved over its dead center vertical position. However, it should be recalled that the wing section 26 carries a number of relatively heavy earth-working instrumentalities such as those indicated at 30 in FIG. 1 and therefore this 90° position of the wing section 26 is not, in fact, a position of stable equilibrium. The outwardly projecting earth-working instrumentalities which at this time extend substantially at a right angle to the wing section 26 still present an appreciable gravitational factor which tends to maintain the draw link 72 under tension.

In FIG. 10, although the wing section 26 has assumed its 120° over-center position, this position may represent the position of balanced or stable equilibrium of the wing section due to the fact that the center of gravity of the wing section as a whole, when all of the overhanging earth-working tools 30 are considered, will lie on a vertical plane passing through the hinge pin 45. At this point, the tension in the draw link 72 is relieved and at the same time the pin 86 on the crank arm 70 has reached the upper end of the slot 84.

Continued forward movement of the plunger and yoke will bring the parts to the positions in which they are shown in FIGS. 2 and 11, the draw link 72 now being placed under compression due to the force of gravity acting on the wing section 26 as it goes over its dead-center position and approaches the lean-to support or limit stop 92 (FIG. 1). Because the pin 86 has reached the upper or distal end of the slot 84 in the link 82, this link now functions as a suspension link to prevent sagging of the yoke 60, plunger 58 and cylinder 52. At the time that the wing section 26 engages the lean-to limit stop 92, the locking ear 94 overlies such stop and the fastening pin 96 may then be placed in position as previously described to rigidify the wing section relative to the tool bar section 52. Also, at this time, and as shown in FIG. 11, the rear edge of the crank arm 20 comes into engagement with the upper edge of the bight portion 64 of the yoke 60, this portion of the yoke thus serving as a limit stop to prevent the cylinder from going over dead center.

It is to be noted that the plunger 58 functions in compression throughout a major portion of its forward stroke, such compression being relieved only after the wing section 26 has exceeded the 120° position of equilibrium which is illustrated in FIG. 10. During this forward stroke of the plunger 58, the draw link 72 functions initially in tension but, after the wing section 26 attains its 120° position of equilibrium, the draw link shifts from tension to compression and thus serves in a measure to place the plunger 58 under tension and assist the same in its forward motion.

Lowering of the wing section 26 to its earth-working position is accomplished by the simple expedient of reversing the flow of fluid to the cylinder 52 so that the fluid enters the cylinder through the fluid line 68, it being understood, of course, that initially the fastening pin 94 will be removed. The movement of the various parts which cooperate to make up the novel wing section actuating mechanism of the present invention, and the sequence of their movements is substantially a reversal of the movement and sequence which has been set forth in connection with raising of the wing section 26 and therefore they will not be described in detail herein. It is important, however, to note that as soon as the plunger 58 and yoke 60 commence their reverse movement, the fact that the suspension link 82 is at that time maintaining the cylinder 52 in an elevated position prevents the draw link 72 from going over dead center, i.e. starting to move in a counterclockwise direction instead of the required clockwise direction.

During such retraction stroke of the plunger 58, the latter initially functions in tension until such time as the wing section 26 is restored to its 120° position of equilibrium as illustrated in FIG. 10. During this time the draw link 72 functions in compression under the influence of the forces applied to it by the pivot pins 76 and 74. Thereafter, when the wing section 26 has moved past the 120° position of equilibrium, the relatively heavy mass of such section operates to place the draw link 72 under tension and the latter, in effect, serves to place the plunger 58 under compression and thus assist it in its rearward movement.

If it were not for the presence of the draw link 82, any sagging of the cylinder and plunger would create an unnatural over-center position of the draw link which, when placed under compression, would not move back into the confines of the main tool bar section 22 for proper cooperation with the latch block 80. It is also to be noted that upon lowering of the wing section 26, the slotted link 82 is guided by the pin 86 of the crank arm in such a manner that it rotates in a clockwise direction and folds back into its normal position within the hollow tool bar section 22.

The principal feature of the present invention resides in the fact that during raising of the wing section 26 from its lowered position to approximately its condition of equilibrium, as represented by the disclosure of FIG. 10, a relatively constant moment of force is applied to the crank arm 70, and that such force does not decrease appreciably until such time as the gravitational forces acting on the wing section 26 has dropped to relatively small proportions due to the decrease in the cosine function of the included angle between the wing section and the ground. It is pointed out that at any position of the crank arm 70 (and consequently of the wing section 26) the effective moment arm acting on the crank arm is the perpendicular distance between the hinge pin 45 and the axis of the plunger 58. It will be observed from an inspection of FIGS. 3 to 8 inclusive, that by reason of the draw link connection between the yoke 60 and the crank arm 70 instead of the conventional direct connection, the plunger 58 does not deviate appreciably from its horizontal position wherein the cylinder lies close to the bottom wall 37 of the tool bar section 22. Even though during movement of the crank arm 70 through the positions in which it is illustrated in FIGS. 3 to 9 inclusive, the crank arm and its associated pin 74 is moving downwardly the axis of the plunger remains substantially horizontal and, therefore, the effective moment arm acting on the crank arm 70 does not decrease. Even in the 90° position of the wing section 26 shown in FIG. 9, only a slight rise in the angularity of the cylinder has taken place so that there still remains an appreciably large moment of force acting on the crank arm 70. From this point until the wing section 26 moves to its final over-center position as shown in FIG. 11, a rise in the elevation and angularity of the cylinder and plunger will progressively take place but, at that time, gravitational considerations are either so small as to require but little force to overcome them, or they operate in a reverse direction tending to shift the crank arm 70 and its associated pin 86 upwardly, thereby placing the slotted link 82 under tension for cylinder-supporting purposes as previously outlined.

From the above description it will be appreciated that the character of the actuating mechanism for the wing section 26 is such that substantially the maximum moment of force of which the mechanism is capable is applied constantly to the crank arm 70 during the time when it is most needed to raise the wing section from its horizontal position, not only through the first several angular degrees of lift, but also through the entire critical angle where the swing-out weight of any tools which may be applied to the wing section presents an appreciable load factor. This constitutes one of the salient features of the invention.

Figure 13:
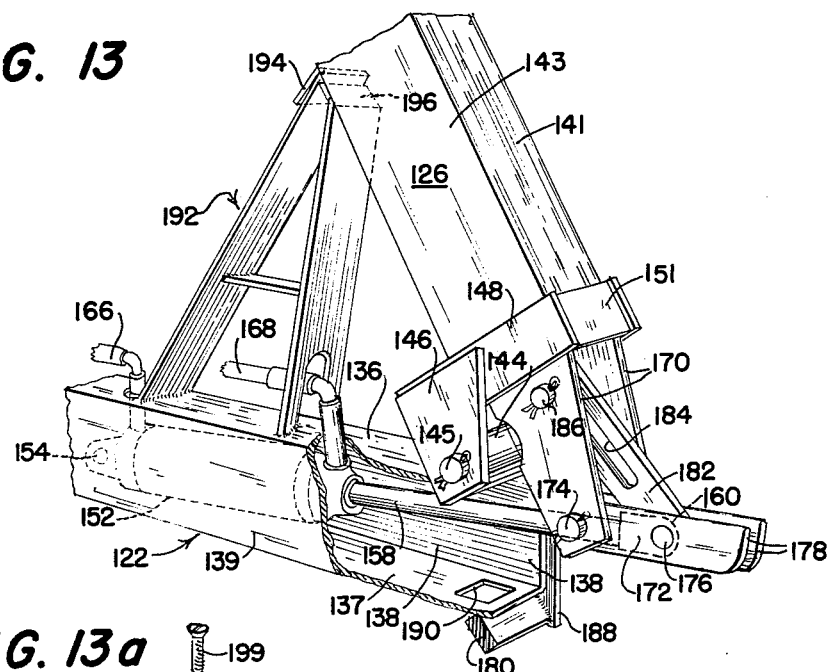
FIG. 13 is a fragmentary perspective view, similar to FIG. 2, showing a modified form of articulated linkage mechanism between the main tool bar section and the adjacent wing section.
Figure 14:
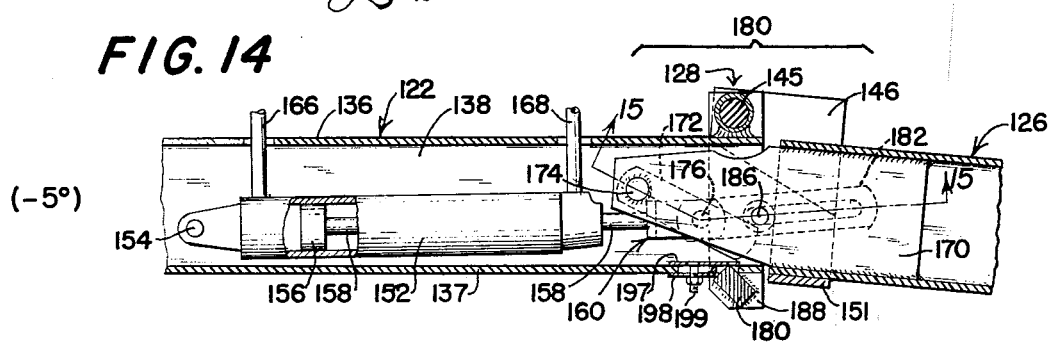
FIG. 14 is a fragmentary longitudinal sectional view of the modified folding tool bar structure of FIG. 13, the view being similar to FIG. 3 but showing the latch lug disabling assembly of FIG. 13a in position and with the tool bar wing lowered beyond its normal horizontally extended position.
Figure 15:
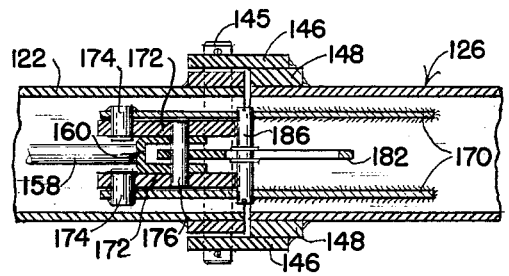
FIG. 15, is a view taken on the line 15—15 of FIG. 14.

In FIGS. 13, 14 and 15, a slightly modified form of articulated linkage mechanisms for effecting movement of the wing section 126 between its lowered ground-engaging position and its raised parked position is shown. Due to the similarity of the structure shown in these views and the structure shown in FIGS. 2, 3 and 12, and in order to avoid needless repetition of description, similar reference numerals but of a higher order have been applied to the corresponding parts as between the disclosures of FIGS. 2 and 13 for example.

In this latter form of the invention, the single rigid crank arm 70 has been replaced by two laterally spaced apart crank arms 170 of similar construction, while the dual floating slotted suspension link 82 has been replaced by a single slotted suspension link 182. To accommodate these substitutions, the separate pivot pins 76 have been replaced by a single pivot pin 176.

Figure 13A:
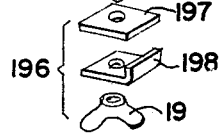
FIG. 13a is an exploded perspective view of a latch lug disabling assembly which is capable of use in connection with the linkage mechanism of FIG. 13.

Whereas, in the previously described form of folding tool bar 10, as illustrated in FIGS. 1 to 13 inclusive, the latch lug 78 and latch block 80 function to lock the wing section 26 in a horizontal extended position as shown in FIG. 3, the tool bar shown in FIGS. 13, 14 and 15 are so designed that the wing section 126 may become lowered below its horizontal position incident to the encountering of an undulatory terrain by the gauge wheels 31. Accordingly, in order that the latch lugs 178 shall not be projected through the opening 190 which is provided in the bottom wall 137 of the tool bar section 122 and thus caused to cooperate with the latch block 180, a closure or blocking plate assembly 196 (see particularly FIG. 13a) is adapted to be positioned relative to the opening 190 as clearly shown in FIG. 14. The assembly 196 embodies a closure plate proper 197 which, when the assembly 196 is in use, is centered on the bottom wall 137 so as to cover the opening 190, together with a lower L-shaped clamping plate 198 which is adapted to underlie the bottom wall. A wing nut and bolt assembly 199 serves to maintain the two plates 197 and 198 in their clamping relationship relative to one edge of the opening 190. When the closure plate assembly 197 is thus in position in the vicinity of the opening 190, it is obvious that movement of the plunger 158 to its fully retracted position will draw the latch lugs 178 over the closure plate 197 as shown in FIG. 14. Thus, in the absence of any locking cooperation between the latch lugs 178 and latch block 180, the wing section 126 is capable of "sagging", so to speak, so that it may assume a below grade angle on the order of approximately 5° as shown in FIG. 14. When the wing section 126 assumes such a below grade angle, the upper inclined edges of the draw links 172 underlie the abutment pin 186 so that upon projection of the plunger 158 the same lever action formerly described in connection with the draw links 72 and single crank arm 70 obtains in connection with the draw links 72 and dual crank arms 170. Otherwise, the operation of the modified form of articulated linkage mechanism remains substantially the same and need not be described in detail herein.

It is to be distinctly understood that the articulated linkage mechanism of FIGS. 13, 14 and 15 is capable of being applied to the tool bar arrangement disclosed in FIGS. 1 through 12 and also, if desired, the closure or blocking plate assembly 196 may be applied to the opening 90 of the tool bar section 22 so as to allow the wing section 26 to move to a below grade position.

In FIGS. 16 and 17 a modified form of folding tool bar construction 220 is illustrated wherein either of the two previously described forms of power-actuated articulated wing-actuating linkage mechanisms are applied to the outer ends of a composite two-part central or inner main tool bar which consists of two separate and normally aligned tool bar sections 222, each of which is pivotally mounted for swinging movement relative to a rigid tractor-mounted support bar 223. Folding wing sections 226 are pivotally connected by pin and plate connections 245, 246, identical with the previously described connections 45, 46, to the outer ends of the main tool bar sections 222. Pivot bars 225 project rearwardly and horizontally from the medial regions of the support bar 223 and project through the opposed end regions of the two main tool bar sections 222 so as to establish pivotal axes for limited swinging movement of these sections. Guide brackets 227 mounted on the outer ends of the support bar 223 slidingly receive the outer end portions of the main tool bar sections 222 therethrough and serve to guide such sections in their limited vertical swinging movements under the influence of an undulatory terrain. It will be understood, of course, that the support bar 223, main tool bar sections 222, and wing sections 226 are provided with the usual necessary adjuncts such as attachment means whereby the support bar may be mounted on the tractor, and whereby the desired earth working and treating tools or other devices may be positioned on any or all of the tool bar sections at suitable locations therealong. Reference is hereby made to U.S. Pat. No. 3,741,312 which shows generally this pivoted tool bar construction.

Insofar as the articulated mechanisms for raising the two wing sections 226 between their lowered operative positions and their raised parked positions, these mechanisms as previously stated may be substantially identical with those illustrated in either FIGS. 2 to 12 inclusive, or FIGS. 13, 14 and 15. Therefore, again in order to avoid needless repetition of description, similar reference numerals but of a still higher order have been applied to the corresponding parts as between the disclosure of FIG. 3 on the one hand and FIGS. 16 and 17 on the other hand.

From the above description it will be appreciated that with the tool bar structure of FIGS. 16 and 17, the entire structure, considered as a whole, lends itself to greater overall flexibility whereby each individual tool bar section may adapt itself to an undulatory terrain substantially independently of the remaining tool bar sections, while at the same time the two outermost wing sections 226 are foldable over the two central main tool bar sections 222 for transport purposes.

The invention is not to be limited to the exact arrangement of parts shown in the accompanying drawings or described in this specification as various changes in the details of construction may be resorted to without departing from the spirit of the invention. For example, although the invention, in all of the illustrated forms thereof, has been shown and described in connection with wing sections such as the sections 26, 126 and 226 which fold upwardly, it is within the purview of the invention to employ the articulated power-actuated linkage mechanism which drives such wing sections so that the wing sections fold either forwardly or rearwardly about vertical axes instead of horizontal axes. Therefore, only insofar as the invention has particularly been pointed out in the accompanying claims is the same to be limited.

What is claimed is:

1. A sectional folding tool bar for agricultural implements and including a normally horizontal inner hollow tubular section and an outer wing section, an offset hinge connecting said sections in end-to-end relationship for swinging movement of the wing section between a normal operative earth-working position in alignment with the inner section, and an inoperative folded position wherein it is out of alignment with said inner section, a crank arm on said wing section which normally extends into the adjacent open end of the inner section when the sections are in alignment, a hydraulic cylinder pivotally mounted within the inner section and having a normally retracted plunger, a draw link having a forward end pivoted to the outer end of the plunger and a rear end pivoted to the crank arm in reentrant fashion relative to the plunger whereby, upon projection of the plunger, the draw link will function in tension to swing the crank arm forwardly and out of the inner section for wing section displacement purposes, the pivotal connection between the draw link and crank arm is offset from the axis of the plunger whereby the draw link normally assumes an inclined position relative to the axis of the plunger, and an abutment on the crank arm is positioned in the path of movement of the draw link and is engageable by the latter during initial projection of the plunger for the application of torque to the crank arm.

2. A sectional folding tool bar for agricultural implements and including a normally horizontal inner hollow tubular section and an outer wing section, an offset hinge connecting said sections in end-to-end relationship for swinging movement of the wing section between a normal operative earth-working position in alignment with the inner section, and an inoperative folded position wherein it is out of alignment with said inner section, a crank arm on said wing section which normally extends into the adjacent open end of the inner section when the sections are in alignment, a hydraulic cylinder pivotally mounted within the inner section and having a normally retracted plunger, a draw link having a forward end pivoted to the outer end of the plunger and a rear end pivoted to the crank arm in reentrant fashion relative to the plunger whereby, upon projection of the plunger, the draw link will function in tension to swing the crank arm forwardly and out of the inner section for wing section displacement purposes, the pivotal connection between the draw link and crank arm is normally disposed between the axis of said offset hinge and the pivotal connection between the draw link and plunger, whereby the draw link normally assumes an inclined position relative to the inner tool bar section.

3. A sectional folding tool bar for agricultural implements and including a normally horizontal inner hollow tubular section and an outer wing section, an offset hinge connecting said sections in end-to-end relationship for swinging movement of the wing section between a normal operative earth-working position in alignment with the inner section, and an inoperative folded position wherein it is out of alignment with said inner section, a crank arm on said wing section which normally extends into the adjacent open end of the inner section when the sections are in alignment, a hydraulic cylinder pivotally mounted within the inner section and having a normally retracted plunger, a draw link having a forward end pivoted to the outer end of the plunger and a rear end pivoted to the crank arm in reentrant fashion relative to the plunger whereby, upon projection of the plunger, the draw link will function in tension to swing the crank arm forwardly and out of the inner section for wing section displacement purposes, the forward end of the draw link is provided with a latch lug and the inner tubular section is provided with a fixed latch member against which the latch lug seats when the plunger is in its retracted position.

4. A sectional folding tool bar for agricultural implements and including a normally horizontal inner hollow tubular section and an outer wing section, an offset hinge connecting said sections in end-to-end relationship for swinging movement of the wing section between a normal operative earth-working position in alignment with the inner section, and an inoperative folded position wherein it is out of alignment with said inner section, a crank arm on said wing section which normally extends into the adjacent open end of the inner section when the sections are in alignment, a hydraulic cylinder pivotally mounted within the inner section and having a normally retracted plunger, a draw link having a forward end pivoted to the outer end of the plunger and a rear end pivoted to the crank arm in reentrant fashion relative to the plunger whereby, upon projection of the plunger, the draw link will function in tension to swing the crank arm forwardly and out of the inner section for wing section displacement purposes, a clearance opening is formed in the wall of the inner tubular section through which the latch lug projects for cooperation with the latch member when the plunger is in its fully retracted position.

5. A folding tool bar for agricultural implements and including a normally horizontal inner hollow tubular section and an outer wing section, an offset hinge connecting said sections in end-to-end relationship for swinging movement of the wing section between a normal lowered operative earth-working position and a raised inoperative parked position, a crank arm on said wing section which normally extends into the adjacent open end of the inner section when the sections are in alignment, a hydraulic cylinder pivotally mounted within the inner section and having a normally retracted plunger, a draw link having a forward end pivoted to the outer end of the plunger and a rear end pivoted to said crank arm in reentrant fashion relative to the plunger whereby, upon projection of the plunger the draw link will function in tension to swing the crank arm forwardly and out of the inner section for wing section raising purposes the pivotal connection between the draw link and plunger is normally disposed below the level of the pivotal connection between the draw link and crank arm whereby the draw link normally assumes a forwardly and downwardly inclined position, and an abutment on the crank arm is positioned in the path of movement of the draw link and is engageable by the latter during initial projection of the plunger for application of torque to the crank arm.

6. A folding tool bar as set forth in claim 5, wherein the forward end of the draw link is provided with an extension which constitutes a latch lug, and the inner tubular section is provided with a fixed latch member against which the latch lug seats when the plunger is in its retracted position.

7. A folding tool bar as set forth in claim 5, wherein the forward end of the draw link is provided with an extension which constitutes a latch lug, a cooperating latch member is fixedly secured to the inner tubular section exteriorly thereof, and a clearance opening is formed in the wall of the inner tubular section and through which said latch lug projects for cooperation with the latch member when the plunger is in its retracted position.

8. A folding tool bar as set forth in claim 7, wherein a closure member is removably associated with said clearance opening and serves, when in position thereover, to prevent said latch lug from entering said opening.

9. A folding tool bar as set forth in claim 7, wherein a suspension link is pivoted at its proximate end to the plunger and is provided with an elongated slot therein, and a guide pin is mounted on the crank arm, projects through said slot, and is engageable with the distal end of the latter when the plunger is in its projected position, thereby placing the suspension link under tension and supporting the plunger and its associated cylinder in an elevated position.

10. A folding tool bar as set forth in claim 9, wherein said guide pin is engageable with the proximate end of the slot in the suspension link shortly after initial projection of the plunger, whereby upon continued projection of the plunger, the suspension link will function in compression to apply torque to the crank arm.

11. A folding tool bar as set forth in claim 10, wherein said guide pin on the crank arm constitutes the abutment which is engageable by the draw link.

12. A folding tool bar for agricultural implements and including a normally horizontal inner hollow tubular section and an outer wing section, an offset hinge connecting said sections in end-to-end relationship for swinging movement of the wing section between a normal lowered operative earth-working position and a raised inoperative parked position, a crank arm on said wing section which normally extends into the adjacent open end of the inner section when the sections are in alignment, a hydraulic cylinder pivotally mounted within the inner section and having a normally retracted plunger, a draw link having a forward end pivoted to the outer end of the plunger and a rear end pivoted to said crank arm in reentrant fashion relative to the plunger whereby, upon projection of the plunger, the draw link will function in tension to swing the crank arm forwardly and out of the inner section for wing section raising purposes, the effective length of said plunger, less the effective length of the draw link, is such that when the plunger is fully projected, the wing section is moved beyond its 90° position relative to the inner tubular section and thus overlaps the latter.

13. A folding tool bar for agricultural implements and including a normally horizontal inner hollow tubular section and at least one outer wing section, an offset hinge connecting said sections in end-to-end relationship for swinging movement of the wing section between a normal lowered earth-working position of alignment with the inner section and an inoperative raised position, a crank arm on said wing section which normally extends into the adjacent open end of the inner section when the sections are in alignment, a hydraulic cylinder pivotally mounted within the inner section and having a normally retracted plunger, a yoke mounted on the forward end of the plunger and presenting a pair of forwardly extending yoke arms which, in all positions of the crank arm, straddle the outer end region of the latter, a pair of parallel draw links on opposite sides of the crank arm and having their rear ends pivoted in common to the distal end of the crank arm and their forward ends individually pivoted to the forward ends of the yoke arms in reentrant fashion relative to the yoke whereby, upon projection of the plunger, the draw links will be displaced angularly and function in tension to swing the crank arm downwardly within the confines of the yoke and forwardly past the offset hinge and out of the inner tool bar section for wing section folding purposes the forward ends of said parallel draw links are provided with extensions which, collectively, establish a latch lug, and a latch member is fixedly secured to the inner tubular tool bar section for latching cooperation with said latch lug when the plunger is in its retracted position.

14. A folding tool bar as set forth in claim 13, wherein the forward ends of said parallel draw links are provided with extensions which, collectively, establish a latch lug, and a latch member is fixedly secured to the inner tubular tool bar section for latching cooperation with said latch lug when the plunger is in its retracted position.

15. A folding tool bar as set forth in claim 13, wherein the latch member is secured to the inner tubular tool bar section exteriorly thereof, and a clearance opening is formed in the wall of the inner tubular section and through which the latch lug projects when the plunger is in its fully retracted position.

16. A folding tool bar as set forth in claim 13, wherein the latch member is secured to the inner tubular tool bar section exteriorly thereof, a clearance opening is formed in the wall of the inner tubular section and through which the latch lug projects when the plunger is in its fully retracted position, and a closure member is removably associated with said opening and serves, when in position thereover, to prevent said latch lug from entering said opening.

17. A folding tool bar as set forth in claim 13, wherein interengaging means on the extensions of said parallel draw links and crank arm are effective to apply torque to the crank arm by a leverage action upon initial angular shifting of said parallel draw links for wing section folding purposes.

18. A folding tool bar as set forth in claim 17, wherein said interengaging means on the extensions and crank arm is established by the provisions of a lateral abutment on each side of the crank arm and which is engageable by the extension of one of said parallel draw links.

19. A folding tool bar as set forth in claim 18, wherein said crank arm is in the form of a flat plate which normally extends edgewise and endwise into the adjacent open end of the inner tubular tool bar section, and said lateral abutments are established by the provision of a lift pin which projects through said crank arm and normally overhangs the extensions of said parallel draw links.

20. A folding tool bar as set forth in claim 19, wherein a pair of suspension links are pivoted at their proximate ends to the forward end regions of the yoke arms respectively and project forwardly therefrom in straddling relationship relative to the crank arm, elongated slots are provided in the suspension links, and said lift pin projects through said slots and is engageable with the distal ends of the latter when the plunger is in its projected position, thereby placing the suspension links under tension in supporting relation relative to the yoke and its associated plunger and cylinder.

21. A folding tool bar as set forth in claim 20, wherein said lift pin is engageable with the proximate end of said slots shortly after initial projection of the plunger whereby, upon continued projection of the plunger, the suspension links will function in compression to apply torque to the crank arm.

22. A folding tool bar for agricultural implements and including a normally horizontal inner hollow tubular section and at least one outer wing section, an offset hinge connecting said sections in end-to-end relationship for swinging movement of the wing section between a normal lowered earth-working position of alignment with the inner section and an inoperative raised position, a pair of spaced apart parallel crank arms on said wing section and which normally extend into the adjacent open end of the inner section when the inner sections are in alignment, a hydraulic cylinder pivotally mounted within the inner section and having a normally retracted plunger, a pair of spaced apart draw links having their forward ends pivoted to the outer end of the plunger on opposite sides thereof in straddling relation relative thereto and their rear ends pivoted to the crank arms respectively in reentrant fashion relative to the plunger whereby, upon projection of the plunger, the draw links will function in tension to swing the crank arms forwardly and out of the inner section for wing section raising purposes, the pivotal connection between the draw links and plunger is disposed below the level of the pivotal connections between the draw links and crank arms whereby the draw links normally assume forwardly and downwardly inclined positions, and abutments on crank arms are positioned in the paths of movement of the draw links and are engageable by the latter during initial projection of the plunger for application of torque to the crank arm.

23. A folding tool bar as set forth in claim 22, wherein a suspension link has its proximate end pivoted to the plunger and is provided with an elongated slot therein, said suspension link being straddled by the crank arms, and a guide pin carried by said crank arms projects through said slot and is engageable with the distal end of the latter when the plunger is in its projected position, thereby placing the suspension link under tension and supporting the plunger and its associated cylinder in an elevated position.

24. A folding tool bar as set forth in claim 23, wherein said guide pin is engageable with the proximate end of the slot in the suspension link shortly after initial projection of the plunger whereby, upon continued projection of the plunger, the suspension link will function in compression to apply torque to the crank arm.

25. A folding tool bar for agricultural implements and including a normally horizontal inner hollow tubular section and at least one outer wing section, an offset hinge connecting said sections in end-to-end relationship for swinging movement of the wing section between a normal lowered earth-working position of alignment with the inner section and an inoperative raised position, a pair of spaced apart parallel crank arms on said wing section and which normally extend into the adjacent open end of the inner section when the inner sections are in alignment, a hydraulic cylinder pivotally mounted within the inner section and having a normally retracted plunger, a yoke mounted on the forward end of said plunger and presenting a pair of forwardly extending yoke arms, a pair of parallel draw links which straddle the yoke and have their rear ends pivoted to the distal ends of the crank arms respectively and their forward ends pivoted to the forward ends of the yoke arms in reentrant fashion relative to the yoke whereby, upon projection of the plunger, the draw links will be displaced angularly and function in tension to swing the crank arms downwardly and forwardly past the offset hinge and out of the inner tool bar section for wing folding purposes, an elongated suspension link is pivoted at its proximate end to the forward ends of said yoke arms and projects forwardly therefrom and is straddled by both the yoke arms and crank arms, an elongated slot is provided in the suspension link, and a lift pin projects through said slot and has its end secured in said crank arms, said lift pin being engageable with the distal end of the slot when the plunger is in its projected position, thereby placing the suspension link under tension in supporting relation relative to the yoke and its associated plunger and cylinder.

26. A folding tool bar as set forth in claim 25, wherein said lift pin is engageable with the proximate end of said slot shortly after initial projection of the plunger whereby, upon continued projection of the plunger, the suspension link will function in compression to apply torque to the crank arm.

27. In an agricultural earth-working and earth-treating implement, in combination, a rigid transversely extending horizontal support bar adapted to be supported from a tractor, a pair of normally aligned, transversely extending, horizontal, hollow tubular inner tool bar sections having their adjacent ends pivotally mounted on the rear side of said support bar in the medial region thereof and on opposite sides of the central longitudinal axis of the implement for limited swinging movement in vertical planes so that such inner sections individually may conform to the ground surface over which the implement moves, a pair of guide brackets on the opposite ends of said support bar through which respective inner tool bar sections slidably project for preventing rearward displacement of such sections during forward movement of the implement, a wing section on the outer end of each inner section, an offset hinge connecting each wing section and its respective inner section in end-to-end relationship for swinging movement of the wing section between a normal earth-working position in substantial alignment with its respective inner section and an inoperative folded position wherein it is out of alignment with such section, a crank arm on each wing section which extends into the adjacent open end of its associated inner section when such sections are in alignment, a hydraulic cylinder pivotally mounted within the inner section and having a normally retracted plunger, a draw link having a forward end pivoted to the outer end of the plunger and a rear end pivotally connected to the crank arm in reentrant fashion relative to the plunger whereby, upon projection of the plunger, the draw link will function in tension to swing the crank arm out of the inner section for wing section displacement purposes.

28. In an agricultural implement, the combination set forth in claim 27, wherein the pivotal connection between the draw link and crank arm is offset from the axis of the plunger, whereby the draw link normally assumes an inclined position relative to the axis of the plunger, and an abutment on the crank arm is positioned in the path of movement of the draw link and is engageable by the latter during initial projection of the plunger for the application of torque to the crank arm.

29. In an agricultural implement, the combination set forth in claim 27, wherein the pivotal connection between the draw link and crank arm is normally disposed between the axis of the associated offset hinge and the pivotal connection between the draw link and plunger, whereby the draw link normally assumes an inclined position relative to the adjacent inner tool bar section.

* * * * *